US008818172B2

(12) United States Patent
Khatib et al.

(10) Patent No.: US 8,818,172 B2
(45) Date of Patent: Aug. 26, 2014

(54) MULTI-USER REMOTE VIDEO EDITING

(75) Inventors: Maher Khatib, Quebec (CA);
Mahmoud J. Al-Daccak, Quebec (CA)

(73) Assignee: Avid Technology, Inc., Burlington, MA (US)

( * ) Notice: Subject to any disclaimer, the term of this patent is extended or adjusted under 35 U.S.C. 154(b) by 258 days.

(21) Appl. No.: 12/754,826

(22) Filed: Apr. 6, 2010

(65) Prior Publication Data
US 2010/0260468 A1    Oct. 14, 2010

Related U.S. Application Data

(60) Provisional application No. 61/169,125, filed on Apr. 14, 2009, provisional application No. 61/239,600, filed on Sep. 3, 2009.

(51) Int. Cl.
*H04N 5/93* (2006.01)
*G11B 27/034* (2006.01)
*H04N 21/2662* (2011.01)
*H04N 21/2343* (2011.01)
*G06F 11/07* (2006.01)
*H04N 21/647* (2011.01)

(52) U.S. Cl.
CPC .......... *G11B 27/034* (2013.01); *H04N 21/2662* (2013.01); *H04N 21/23439* (2013.01); *G06F 11/0757* (2013.01); *H04N 21/64792* (2013.01)
USPC ...................................................... 386/278

(58) Field of Classification Search
USPC ...................................................... 386/278
See application file for complete search history.

(56) References Cited

U.S. PATENT DOCUMENTS

| | | | | |
|---|---|---|---|---|
| 7,624,337 | B2 * | 11/2009 | Sull et al. ............ | 715/201 |
| 7,783,154 | B2 * | 8/2010 | Wilkins et al. ........ | 386/281 |
| 7,970,260 | B2 * | 6/2011 | Haot et al. .......... | 386/278 |

(Continued)

FOREIGN PATENT DOCUMENTS

| | | |
|---|---|---|
| JP | 2004-357035 | 12/2004 |
| JP | 2006-157389 | 6/2005 |

(Continued)

OTHER PUBLICATIONS

Le Mer, de Erwan, "Maxedit: Le futur du montage video pour maintenant?", Oct. 1, 2008, XP002594668, retrieved from the Internet: http://webcache.googleusercontent.com/search?q=cache:EPpHYuSKUQwJ:yakyakyak.fr/phpBB3/viewtopic.php%Ff%3D17%26T%3D93; retrieved on Jul. 30, 2010.

(Continued)

*Primary Examiner* — Thai Tran
*Assistant Examiner* — Jose Mesa
(74) *Attorney, Agent, or Firm* — Oliver Strimpel

(57) ABSTRACT

Methods and systems for remote video editing include a source media file on a storage device and an input for receiving video editing commands, over a low-bandwidth network, pertaining to the source media file. A virtual representation of the source media file includes the editing commands and a link to the source media file. A media delivery engine reads the source media file over a high-bandwidth link, applies the editing commands thereto, and produces a proxy representation of the edited source media file, and an output transmits the proxy representation over the low-bandwidth network. Requested individual frames of the edited media may also be output.

19 Claims, 7 Drawing Sheets

(56) References Cited

U.S. PATENT DOCUMENTS

| | | | |
|---|---|---|---|
| 8,005,345 B2* | 8/2011 | Haot et al. ............ | 386/249 |
| 8,086,902 B2* | 12/2011 | Rashevsky et al. .......... | 714/38.1 |
| 8,265,457 B2* | 9/2012 | Baum et al. ............ | 386/281 |
| 8,650,477 B2 | 2/2014 | Sudoh et al. | |
| 2001/0004417 A1 | 6/2001 | Narutoshi et al. | |
| 2002/0116716 A1 | 8/2002 | Sideman | |
| 2003/0028680 A1 | 2/2003 | Jin | |
| 2004/0054801 A1* | 3/2004 | Kawasaki et al. ............ | 709/231 |
| 2007/0089151 A1 | 4/2007 | Moore et al. | |
| 2007/0092199 A1* | 4/2007 | Ando et al. ............ | 386/46 |
| 2008/0100694 A1* | 5/2008 | Barkley et al. ............ | 348/14.08 |
| 2008/0285939 A1 | 11/2008 | Baum et al. | |
| 2008/0294721 A1* | 11/2008 | Berndt et al. ............ | 709/204 |

FOREIGN PATENT DOCUMENTS

| | | |
|---|---|---|
| JP | 2007-150994 | 6/2007 |
| WO | WO 00/79799 | 12/2000 |
| WO | WO 2008/094533 | 8/2008 |

OTHER PUBLICATIONS

E. LeMer: "Maxedit: Le futur du montage cur maintenant?", Oct. 1, 2008, XP002594668, retrieved from the Internet, http://webcache.googleusercontent.com/search?q=cache:EPpHYuSkUQwJ:yakyakyak.fr/phpBB3/viewtopic.php%3Ff%3D17%26t%3D93, retrieved Jul. 26, 2010.

Little, Thomas D.C., "Multimedia at Work", IEEE, 1070-986X/99, 1999, 3 pages.

Adobe Premiere Express, Product Brochure, Oct. 14, 2007, 2 pages, from http://web.archive.org/web/20071014013649/http://www.adobe.com/products/premiereexpress/.

JayCut Launches Basic Video editing Tool, Jul. 8, 2007, 2 pages, from http://mashable.com/2007/07/08jaycut/.

* cited by examiner

MULTI-USER REMOTE VIDEO EDITING

CROSS REFERENCE TO RELATED APPLICATIONS

This application claims the benefit of priority to U.S. provisional patent application Ser. No. 61/169,125, filed Apr. 14, 2009, entitled "Multi-user Remote Video Editing" and to U.S. provisional patent application Ser. No. 61/239,600, filed Sep. 3, 2009, entitled "Rendering in a Multi-User Video Editing System," the contents of both of which are incorporated herein by reference. This application is related to U.S. patent application Ser. No. 12/754,843 entitled "Rendering in a Multi-User Video Editing System," filed on even date herewith, which is wholly incorporated herein by reference.

BACKGROUND

Computers running editing software may be used to edit media containing video and/or audio by performing operations including but not limited to cutting, resizing, layering, compositing, tiling, and/or looping. The source material may be, for example, a digital media file encoded in any of a variety of formats; moreover, an analog source medium may be converted into a digital file, edited, and optionally converted back to an analog format. Traditional computer-based video editing systems may be configured to accommodate single or multiple users, though each configuration may have undesirable characteristics. A single-user editing system, for example, does not permit collaboration or resource-sharing among users and may suffer from underutilization, i.e., may be idle during the times that the single user is not performing editing operations or may be nearly idle when the performed editing operations are not computationally expensive. Because a single-user system must be robust enough to handle the most complex editing tasks the user may execute, and because this robustness may come with an associated expense, any idle time the single-user system encounters wastes the capital invested in the system.

A multi-user system, on the other hand, may permit its users to share centrally-located media. For example, a file server may host a single copy of a media file and distribute it to client workstations connected over a local-area network. Alternatively, an http server may stream a media file to client workstations connected via the Internet. In either case, the centralized storage of the media file may increase the overall efficiency of the video-editing application. There are several disadvantages, however, to traditional multi-user editing systems. For one, they require both a powerful server to host and distribute the media files and powerful workstation clients to perform the actual editing. The workstation clients, like the single-user systems described above, must be robust enough to handle complex editing tasks yet may suffer from underutilization because a user at a given workstation will not always use the full power of the client. Furthermore, a file or http server lacks the ability to intelligently process a file or stream before sending it to a client. For example, a complex, professional-quality editing project may layer several audio and video clips together simultaneously to create composited media. The file or http server, however, must transmit the entirety of each layer to the requesting client, thereby further taxing system resources.

Another disadvantage of traditional multi-user systems is the large amount of network bandwidth they require. "Online" editing—the direct modification of a source media file by a client—requires either that the client first downloads the entire source media file from the server to local storage, uploading the media file when editing is complete, or that the client accesses the source media file via a networked file system. In either case, the large amount of network traffic generated between the server and the client requires a very high-bandwidth and expensive client/server network. To alleviate some of this traffic, traditional multi-user systems may use "offline" editing, wherein a reduced-sized copy of the source media (a "proxy") is generated and sent to the client in lieu of the original, larger-sized media file. The client may edit the proxy, and the sequence of editing commands performed on the proxy (the "timeline") may be applied (or "relinked") to the source media. Offline editing, however, suffers from the disadvantage that a significant amount of network bandwidth and client processing power is still required to transmit and edit the proxy, in addition to the wasted time, processing resources and storage required to pre-generate these proxies. Furthermore, during the time that a user is editing an offline proxy, the source media may be changed by, for example, replacing the original media or adding new source media to the project thus necessitating the laborious task of keeping track of pre-generated proxy and continuously synchronizing them with the original media. Finally, complicated editing functions, such as certain high-end effects, cannot be performed offline and must be executed online.

Furthermore, traditional remote-access video systems generally do not permit the precise, fast, and frame-by-frame control of source media required for video editing. Most video encoding schemes use different types of frames, not all of which are self-contained. For example, a given frame may be a fully-specified picture frame known as an intra-coded picture frame or I-frame. Other frames, however, are not fully specified, and instead capture only differences between the current frame and the last I-frame. These frames are known as predicted-picture frames ("P-frames") or bipredicted-picture frames ("B-frames"). If a user requests a frame that happens to be a P- or B-frame, an editing application must backtrack to the last I-frame and then track forward through the intermediary P- and B-frames, reconstructing the requested frame along the way. Fast execution of this operation, however, requires local access to the entire media file, which for traditional remote-access systems means downloading the entire media file and thereby incurring the network bandwidth penalties described above. Without local access to the source media file, a remote client estimates the position in the media file that a requested frame occupies, and any errors in the estimation incur a time penalty in the frame seek time.

Many of the above disadvantages are exacerbated by of higher-resolution video formats such as HDTV. The larger resolutions and corresponding file sizes of HDTV-like media files require both increased processing power to analyze and greater network bandwidths to transport. This trend will only continue as the resolution and quality of video signals increase, requiring ever-increasing amounts of client processing power and network speeds. Clearly, a need exists for a collaborative, multi-user video editing system that reduces or eliminates the dependency between media file size and client processing power/network bandwidth.

SUMMARY

In general, the systems, methods, and apparatus described herein provide solutions for centralized processing of video editing tasks. Embodiments of the invention may include an application server connected via a high-speed link to local storage and one or more thin clients remotely connected to the server. A user accesses media located on the server through a thin client. When the user wishes to view a particular portion, clip, or frame of the original media, the server may access that portion of the media, reduce its size, and deliver it to the thin client on the fly, i.e., as a real-time response to the request. As the user edits the media with the thin client, a sequence of low-bandwidth instructions representing the editing commands are transmitted back to the server. With an active listening agent, the server executes these commands and reflects their execution in updated streams sent back to the client. Thus, embodiments of the invention described herein reduce or eliminate the need for expensive client-side processing and reduce the strain on the client/server network link.

In general, in one aspect, a system for remote video editing, the system includes: a storage device for storing a source media file; an input for receiving, over a low-bandwidth network, video editing commands pertaining to the source media file; a virtual representation of the source media file, the virtual representation comprising the editing commands and a link to the source media file; a media delivery engine that reads the source media file over a high-bandwidth link, applies the editing commands thereto, and produces a proxy representation of the edited source media file; and an output for transmitting the proxy representation over the low-bandwidth network.

Various embodiments include one or more of the following features. The media delivery engine is a streaming engine and the proxy representation is a media stream. The system includes a plurality of virtual representations, each of the virtual representations comprising one of a plurality of sets of editing commands. The system includes a load-balancing module for allocating each of the plurality of virtual representations to one of a plurality of processing devices. A plurality of the video editing commands are applied to the virtual representation simultaneously. The low-bandwidth network is a local-area network, a wide-area network, or the Internet. The media delivery engine adjusts the bandwidth of the proxy representation in response at least one of a load on the low-bandwidth network or a load on the high-bandwidth link. The system further includes a watchdog module for recovering from an interruption of service.

In general, in another aspect, a system for remote video editing includes a client comprising: an input for receiving a proxy representation of media; a processor for decoding the proxy representation; a graphical user interface for displaying content represented by the decoded proxy representation; a user input for facilitating entry of commands for editing the decoded proxy representation; and an output for transmitting the editing commands, and a server for receiving the editing commands, applying the editing commands to a source media file, and generating the proxy representation of the media in accordance with the source media file and the editing commands.

Various embodiments include one or more of the following features. The client is a thin client. The client is a desktop computer, workstation, laptop computer, netbook, or a smartphone.

In general, in yet another aspect, a method for remotely editing a video file includes: receiving, at a server, a video editing command from a remote client; modifying, at the server, a virtual representation of a media file in accordance with the received command, the virtual representation comprising a reference to a source media file stored on a storage device, the storage device being connected to the server over a high-speed link; and transmitting, to the thin client, a data stream comprising the source media file modified by the editing commands.

Various embodiments include one or more of the following features. The method further includes receiving text-based video editing commands from a plurality of remote thin clients. The server is connected to the thin client over a low-bandwidth network, which may be a local-area network, a wide-area network, or the Internet.

In general, in a further aspect, a method for streaming a video frame to a remote client includes: receiving, at a server, a request from a remote client for a video frame; searching a media file for the requested frame, the media file being stored on a storage device connected to the server via a high-speed link; and streaming, from the server, the video frame to the client.

Various embodiments include one or more of the following features. The requested video frame is one of a P-frame and a B-frame. The method further comprising seeking backward in the media file to an I-frame and reconstructing the requested frame. The server is connected to the client via a low-bandwidth network.

DETAILED DESCRIPTION

Described herein are various embodiments of methods, systems, and apparatus for centralized editing of time-based media, such as video and audio. In one embodiment, the processing and storage of media files are centralized on a server, and clients access the server over modest network connections. The clients may be configured to rely on the server for the bulk of the required processing (i.e., they may be configured as "thin clients.") The server may create, on the fly, reduced-size, low-bandwidth portions of a source media file and deliver individual frames or stream portions of the created portions out to a client on demand. A client, in turn, transmits low-bandwidth editing commands back to the server. In other words, instead of first downloading an entire proxy copy of a source media file to a client, the server delivers only that portion of the source media file currently being viewed and/or edited on the client. Thus, there is no need to wait for a time-consuming and bandwidth-intensive download to complete before editing may begin.

Figure 1:
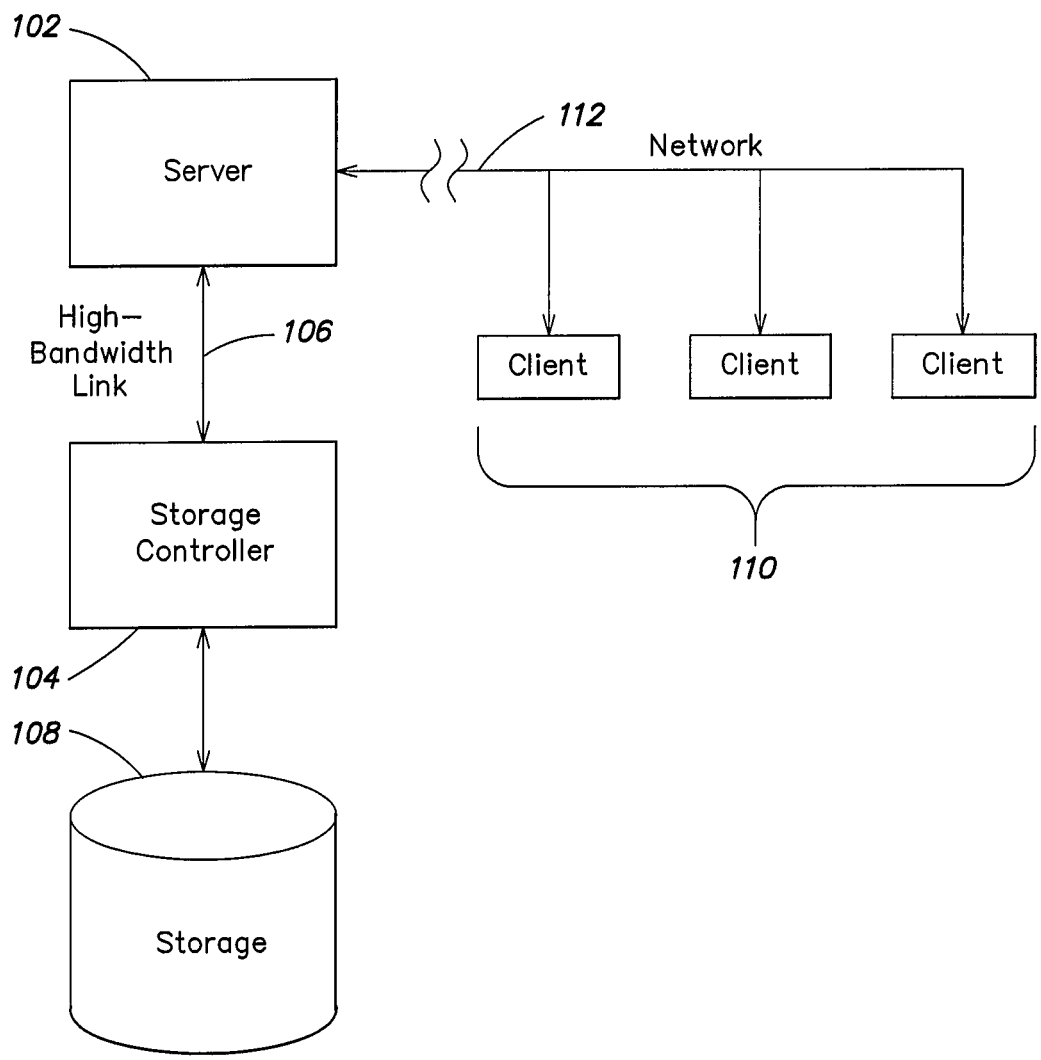
FIG. 1 is a high level block diagram of a system for multi-user remote video editing.

FIG. 1 illustrates one embodiment of a client/server architecture in accordance with the invention. Server 102 is connected to storage controller 104 via high-bandwidth link 106, and the storage controller manages one or more storage devices 108. The high-bandwidth link may be implemented using such protocols as Fibre Channel, InfiniBand, or 10 Gb Ethernet, and may support bandwidths on the order of gigabits per second. The server communicates with one or more remotely located clients 110 over low-bandwidth network 112. The low-bandwidth network may be, for example, an Ethernet or wireless network (limited to bandwidths on the order of megabits per second) or an Internet connection (limited to bandwidths less than one megabit per second). The server may be a single device or a plurality of devices connected in parallel. In some embodiments, the server is a dedicated machine with a known address. In other embodiments, the server comprises one or machines accessed over a network, for example server forming part of a leased computing and storage resource in the "cloud." Other server configurations are possible. In one embodiment, the server is a video-editing application server. The storage controller and storage device may be any of numerous commercially available storage solutions, such as direct-attached storage or network-attached storage.

High-bandwidth network 106 may be optimized for use in particular implementations depending on the requirements of the system. For example, a lower-speed, lower-priced storage solution may be used for applications that require a large storage volume but are able to tolerate slower transfer speeds. Higher-speed storage may be appropriate for systems using high-resolution media files and/or having many users.

Low-bandwidth network 112 may have less throughput than the high-bandwidth link between the server and storage and may be consequently less expensive to implement. There is no upper limit on the bandwidth of the low-bandwidth network, however, and any appropriate network may be used. In various embodiments, the low-bandwidth network is a local-area network, a wide-area network, and/or the Internet. Communication between the server and the clients on the low-bandwidth network may be managed by a dedicated-purpose device, such as a switch. A router, implemented in hardware and/or software, may be used to communicate to clients on the Internet.

Clients 110 may be any appropriate type of computing device, including but not limited to desktop computers, workstations, laptop computers, netbooks, and smartphones. Because the clients are configured to be thin clients, the processing power required to run the client-side editing application is minimal. In one embodiment, the client-side application runs inside a standard web browser, such as Microsoft INTERNET EXPLORER, Mozilla FIREFOX, or Apple SAFARI, and is implemented in a browser-embeddable language such as Java or Flash. The client may therefore be any computing device capable of running a standard web browser. In other embodiments, the client-side application is implemented as a stand-alone application native to a particular operating system and/or device.

In one embodiment, an installment of the current invention includes the server, storage, and thin clients connected locally (e.g., in the same building or campus) by a network. In another embodiment, an installment of the current invention includes only the thin clients. In this embodiment, the thin clients connect to a remotely located server through the Internet. The server may host thin clients connecting from separate entities, persons, businesses, and/or organizations.

Figure 2:
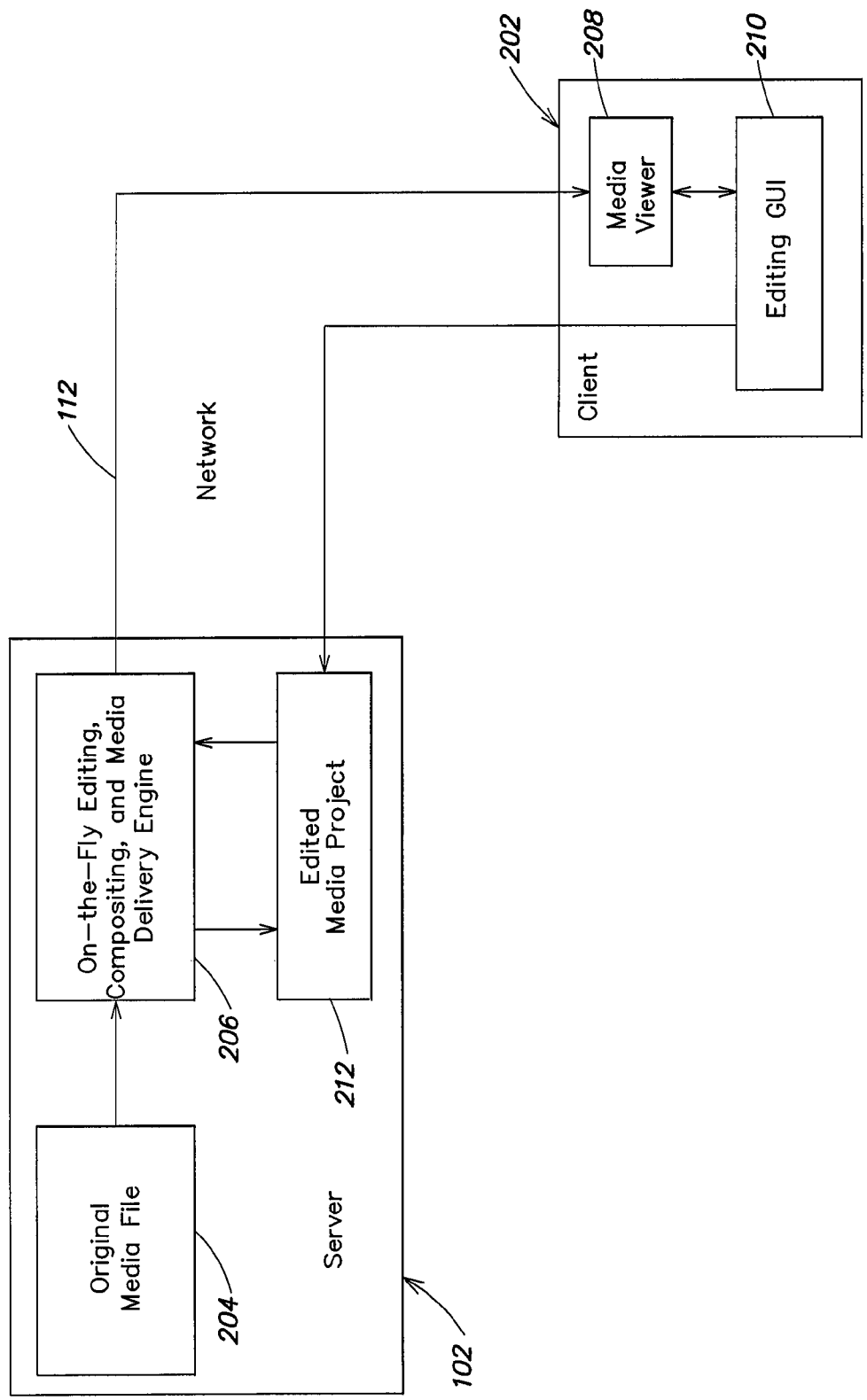
FIG. 2 is a block diagram illustrating the interaction between a server and a client in the multi-user remote video editing system of FIG. 1.

FIG. 2 conceptually illustrates the basic interaction between server 102 and a client 202. The server may include original media files 204 and an engine 206 for editing and compositing the media files and for generating an on-the-fly proxy representation of the content at any point within the media files. The server transmits this proxy representation to the client over low bandwidth network 112, and a user may view the proxy representation at the client using media viewer 208. In one embodiment, the proxy representation is a stream, and the media viewer displays the media stream. In one embodiment, the client includes editing graphical user interface ("GUI") 210 for accepting the user's editing commands. The commands entered by the user may be transmitted back to the server, which collects the commands in an edited media project file 212 and adjusts the outgoing media stream accordingly. Neither the entire original media file nor any entire reduced-size version thereof need be transmitted to the client, and the client itself may not process any editing commands.

Figure 3:
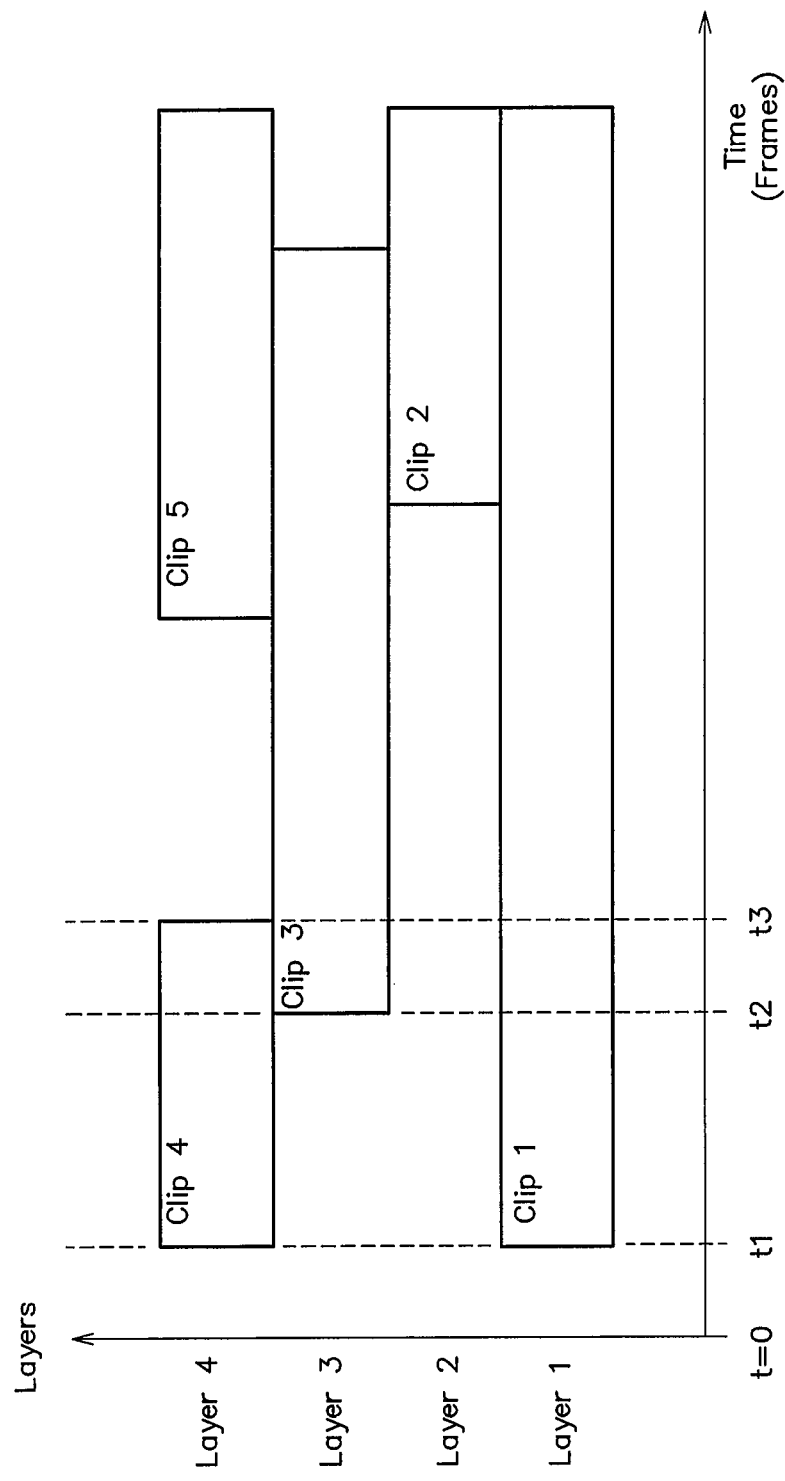
FIG. 3 is a conceptual representation of a video editing project.

Referring briefly to FIG. 3, in order to better explain the functions of the server and the client, a conceptual representation of an editing project is illustrated. In this example, five media clips are arranged on four different layers as shown on the y-axis. The media clips may represent portions of one or more source files, and each clip may contain audio and/or video. Time is represented on the x-axis (a "timeline") and may be delineated according to frames of video. As the editing project is first played back, beginning at time t=0, no clips are displayed. At time t=t1, however, both clips 1 and 4 begin to play. Depending on, for example, the content and opacity of each clip, either clip 1, clip 4, or some combination of the two clips may be seen and/or heard. Clip 3 is added at time t=t2, and clip 4 ends at time t=t3. The beginning and end of each clip may be accompanied by a transition effect, for example, a fade. The rest of the session plays accordingly.

Returning to FIG. 2, in one embodiment, the server hosts an original media file. The media file may represent audio and/or video data uncompressed, compressed, and/or encoded in any of a variety of formats, such as MPEG, DV, WMV, and H.264. In various embodiments, the media file represents a standard-definition ("SD") video signal (e.g., having a resolution of 720 by 480 pixels), a high-definition ("HD") video signal (e.g., having a resolution of 1920 by 1080 pixels, 1280 by 720 pixels, or other HD resolution), or 2K-resolution film scanned material (e.g., having a resolution of 2048 by 1556 pixels).

The original media files may not be locked upon access by a user or users. Instead, because an editing project references an original media file without altering it, multiple users may use the same original media file in parallel. Moreover, multiple users may edit and/or reference the original media files while the files are still being ingested (copied) to the storage. In one embodiment, the editing system automatically manages exclusive access to the part of the media file that is already stored, hence providing the editing capabilities of editing during ingest, such as for live news feeds of media files.

On-the-fly media delivery engine 206 may, in response to input from the client, access the requested part of the media file and stream it to the client. The media delivery engine may send only the particular frames of audio and video necessary for the client to view the media in real time. In one embodiment, the server does not pregenerate the streaming data, but instead generates the data on demand as user requests are received. For example, if a user, through a client, selects or "seeks to" frame 50 of a media file and requests playing of the media from that point onward, the server accesses the original media file at that frame, translates the frame data into an appropriate streaming format, and begins sending the translated stream data to the client. Once the stream data is sent to the client, the server may not retain a copy of it. Instead, if, for example, the user seeks back to frame 50 and requests a replay of that frame, the server will simply regenerate the streaming data from the source media file at that frame and send it again to the client.

As an alternative to streaming a representation of the media file stored on the server, other proxy representations may be generated and sent to the client over low bandwidth network 112. For example, individual frames of video may be sent as JPEG images, or a portion of a video file may be sent as a series of JPEG images.

Server 102 may resize the streaming data before sending it to the client. As stated above, the original media file may be encoded in a high-resolution format, the real-time streaming of which may require a very fast and expensive network link. By resizing the stream before sending it, the server may reduce the throughput required on the client/server network, allowing for the use of less robust networks. In one embodiment, the client may adjust the level of resizing. A larger size may be more suitable for close-ups and detailed editing, for example, while a smaller size may be more suitable for coarse-grained editing commands. In one embodiment, the user may adjust the size of the stream on the fly, i.e., during an editing session, to customize the detail of the viewed stream for specific editing commands and/or to account for variances in network latency.

The server may also include a user's edited media project 212. This project, such as the editing project illustrated in FIG. 3, may contain an edited version of one or more source media files. Instead of actually altering the source media files, however, a virtual representation of the user-specific project may be created. This "time-based object" may contain all of the information relevant to the user's alterations and edits, including, for example, the name of the source file or files, the number of layers, the placement of the source files on the layers, crops, cuts, edits, and similar information. A separate time-based object may be created for each of the user's editing projects and for the projects of other users.

In various embodiments, the time-based object is represented as a text-based file written in, for example, extensible markup language ("XML") or written as an edit decision list ("EDL") file. The time-based object may be saved for further editing, shared with other users, and/or played back as if it were an ordinary media file. An arbitrary number of users may create simultaneous time-based objects, each one different, and each time-based object may reference the same source media file or different media files.

Upon a user's request, the server may export the time-based object into a monolithic media file, such as a .mpg, .dv, or .avi file. The exported media file may then be distributed to viewers who are outside the domain of the described client/server network and who may not have access to the original media file or files on the server. For example, the exported media file may be copied to a DVD or served over an Internet connection. Note, however, that in some embodiments, implementations of the present invention may stream out production-quality copies of the time-based object to viewers without ever creating an exported file. For example, a television news station may broadcast an edited news story directly from the server using only the original source media and the editing information contained in the time-based object.

In one embodiment, the server "composites" or flattens any layers present in the time-based object before its contents are streamed to the client. Doing so collapses the layers—which may be of arbitrary number and complexity—into a stream of known size. In one embodiment, the bandwidth required for the composited stream is approximately 800 kb/s to 1 Mb/s. Even though the client views a composited stream, however, the client may still manipulate the layers in the time-based object as if the stream were not flattened. The original layer information may be maintained at the client and/or at the server, and if the client edits an existing layer, the layer information is updated and the server adjusts the layer data sent to the client accordingly.

Turning now to the client, media viewer 208 may be used to decode and display the stream data or individual frames sent from the server. Because the server may send a low-bandwidth, reduced-size version of the original source media, the processing demand placed on the client to decode the stream may be light. In some embodiments, a very lightweight client with limited processing power requests a stream small enough to play back in real time. The stream size may be set manually by a user or negotiated automatically between the server and the client, and may be changed dynamically as the client's processing resources for playback rise and fall. The stream size may be adjusted by changing the horizontal-by-vertical resolution of the video image displayed at the client, by changing the frame rate of the displayed video, and/or by changing the type and level of compression used to encode the video. The bandwidth of an audio portion of the stream may be similarly adjusted. And, as mentioned above, the client may request different sizes and qualities of streaming data from the server to better perform various editing tasks.

Figure 4:
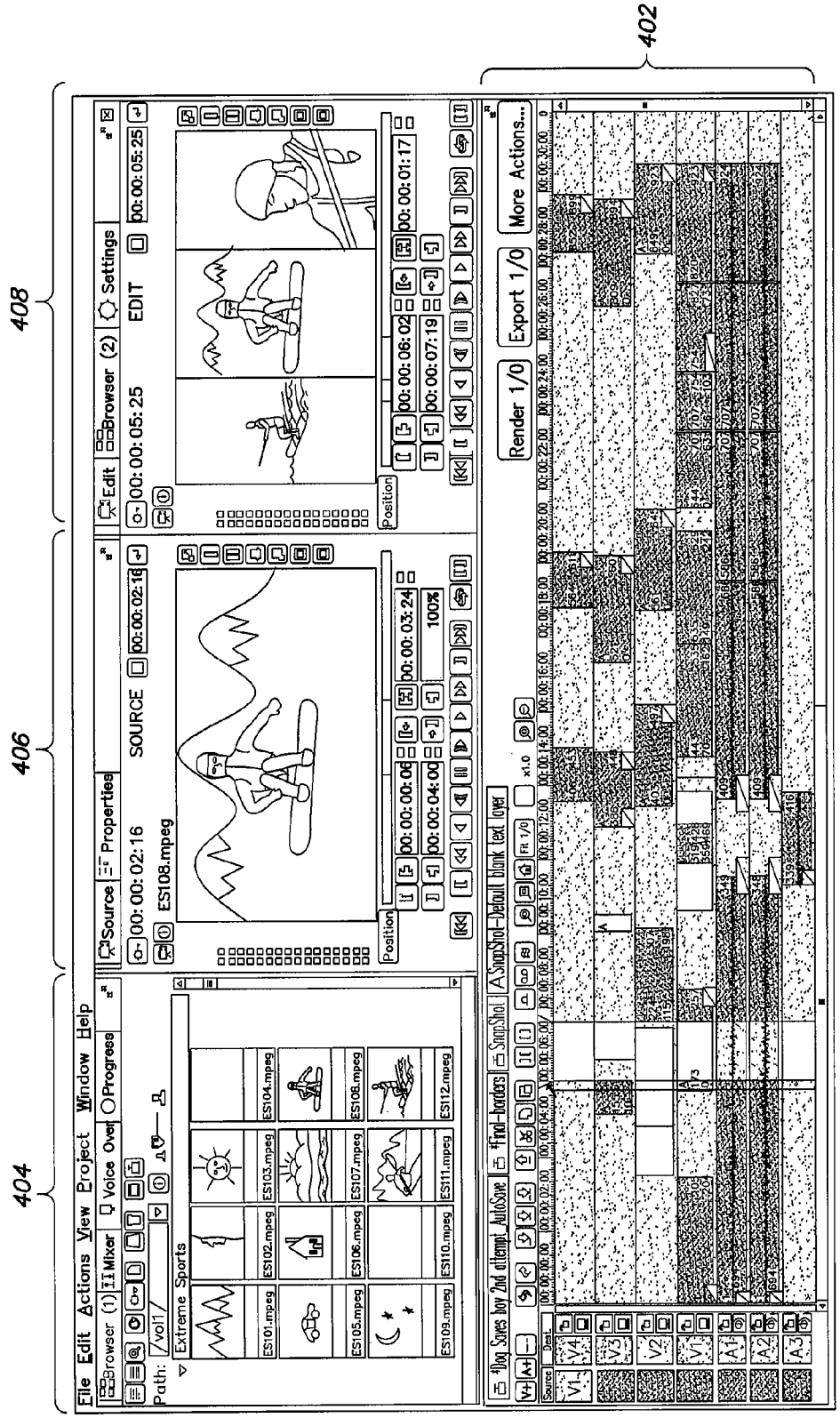
FIG. 4 is a screen shot of a graphical user interface for client in the multi-user remote video editing system of FIG. 1.
Figure 5:
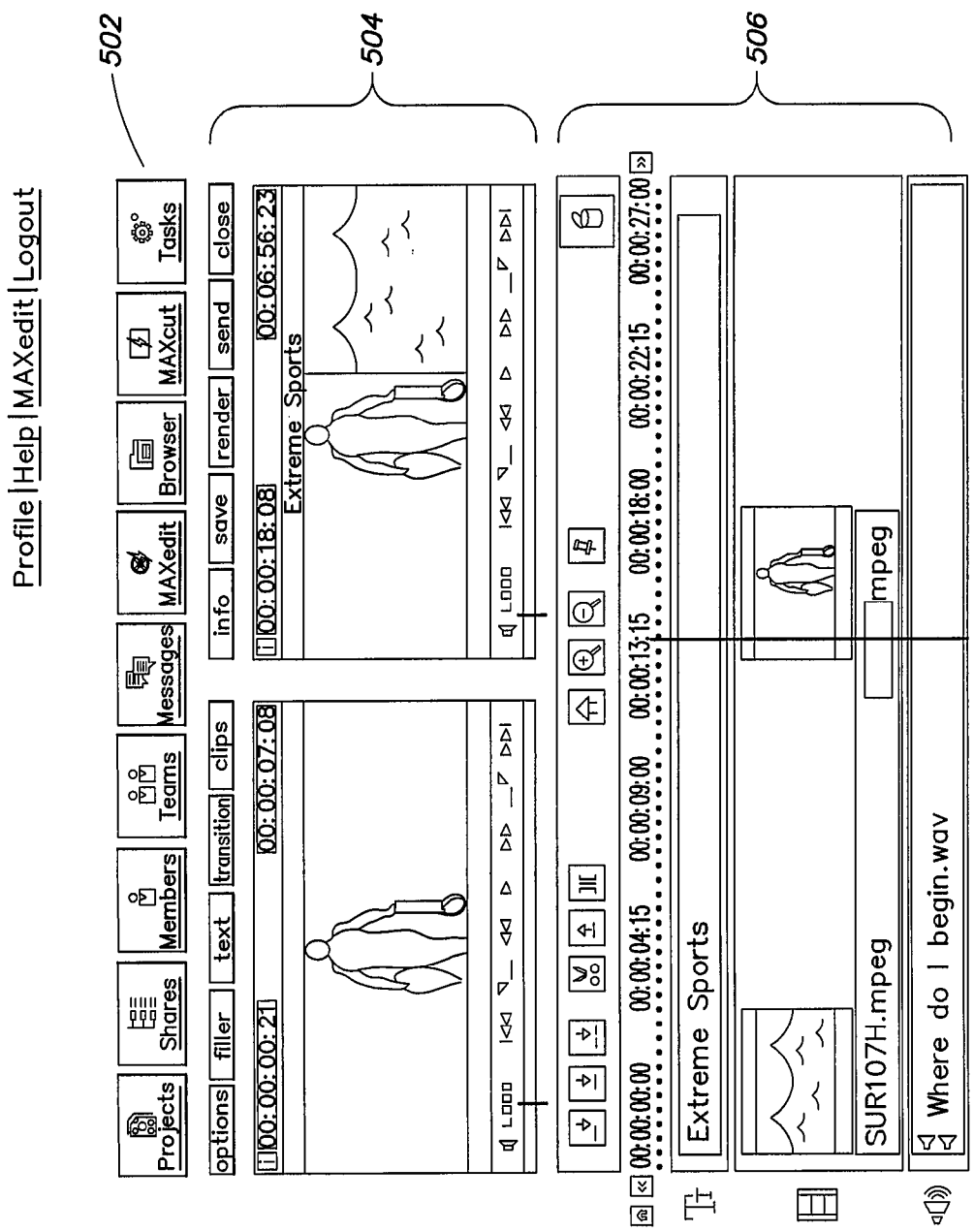
FIG. 5 is an illustration of a top level application window accessible by a client in the multi-user remote video editing system of FIG. 1.

FIGS. 4 and 5 show two examples of GUIs used by the client. Referring to FIG. 4, an example of editing GUI 210, the media is displayed in the upper half of the window, and a representation of the layers used in editing the media is displayed in the lower half of the window. Layer display 402 is similar to the exemplary layers shown in FIG. 3. Here, seven layers are depicted: video layers V1-V4 and audio layers A1-A3. A vertical red line in the layer display represents the location of current playback. As the GUI indicates, video layers V1, V2, and V3 and audio layers A1 and A2 are currently being played. The three video layers may represent three different media files, and the two audio layers may represent left- and right-channel stereo sound. Each audio or video clip may be accompanied by transition effects, such as fades or wipes, depicted in the GUI by black-and-white rectangles at the beginning or end of each clip. A portion of the timeline may be selected by a user, as depicted in the GUI by a lightened area of the layer display, and an editing operation may be applied to the selected portion.

The upper-left corner 404 of the GUI in FIG. 4 shows the contents of a directory of media files depicted as thumbnail images. The thumbnails may be static or may depict the portion of the media file currently being viewed, displaying a progress bar to indicate the relative location, within the file, of a currently viewed frame. The GUI may also include window 406 to depict one of the source media files used during editing in one window and the result of the current edits in a separate window. FIG. 4 illustrates snapshot 408 of an editing session wherein three video clips, depicted on layers V1-V3, are cropped and positioned side-by-side in the upper-right EDIT window. An unedited version of one of the clips is shown in the upper-center SOURCE window. Moreover, FIG. 4 illustrates that different thin clients (i.e., different interfaces) may edit the same media using the same editing server.

FIG. 5 depicts a top-level application window accessible via the client. The application window features toolbar 502 with various functions, including: Projects for storing projects in progress; Shares for accessing data on shared storage; Members and Teams for viewing and managing users of the editing a media resources; Messages; MAXedit for accessing locally or remotely the multiuser media editor; Browser; MAXcut for logging rough cut editing and review and approval tool; and Tasks. A user may use this toolbar to launch, for example, the editing application depicted in FIG. 4. The application window may also be used to play back source media as depicted in central display portion 504, and edited media as shown in bottom portion 506 of FIG. 5.

Figure 6:
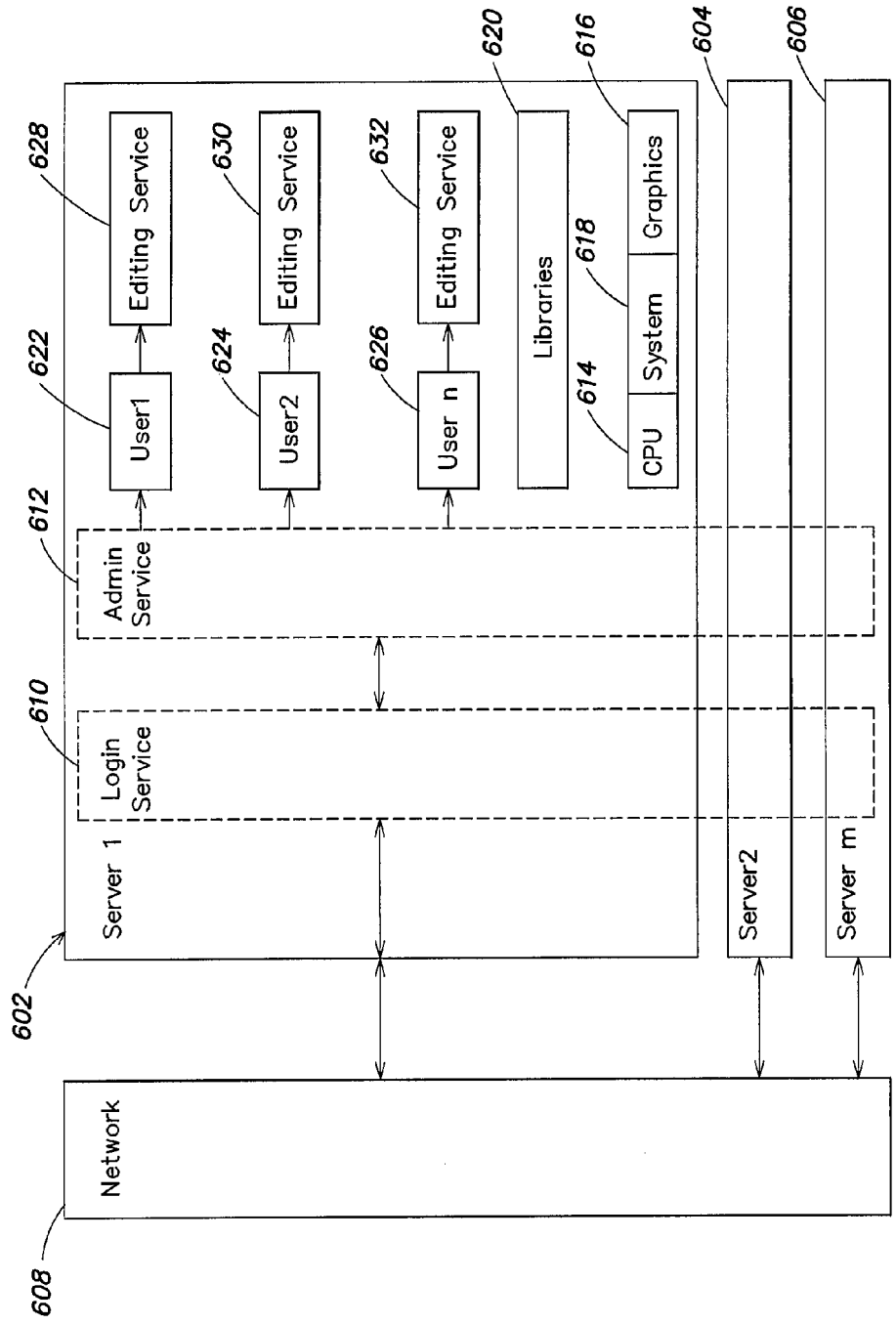
FIG. 6 illustrates a server architecture of in a multi-user video editing system.

FIG. 6 illustrates, in greater detail, one embodiment of the server architecture. One or more physical servers (here, m physical servers) 602, 604, 606 may be connected (e.g., in parallel) to communicate with clients connected to network 608. The physical servers may act in concert to present a single virtual server to the clients or may be configured to grant the clients the ability to log into specific physical servers. The term server, as used herein, may refer to either a physical or virtual server device or a group of physical or virtual servers.

The server may communicate directly with the network, or may do so through a switch. Log-in service routine 610 handles incoming authentication requests, from the clients, and may be located on a single server or across multiple servers. The log-in service may check a user's name and password against a list of known users to determine the legitimacy of a request, and may also verify that the user has a paid-up license to use the service. Administrative and/or system-level tasks may be run or managed by admin service 612, which may similarly be located on a single server or across servers.

Each physical server includes standard hardware and software necessary for its operation, such as central-processing units 614, graphics processors 616, an operating system 618, and user- and system-level libraries 620. The server's hardware and software may be customized beyond that which is standard to improve the performance of video-editing tasks, such as, for example, encoding or decoding processing-intensive media compression schemes.

As users (622, 624, 626) log into the server, the server creates separate processes (628, 630, 632) for each user. Each process may be isolated from other processes. A load-balancing module may automatically determine which of the m servers is best suited to execute a new user request. The load balancing module uses as input parameters that express the processing power of the servers being balanced, together with user-defined parameters that express desired weighting of the various factors in the load balancer. For each server, CPU usage, memory usage is tracked, as well as the total number of active connections to system across all servers. In one embodiment, the load balancer computes the load on a server as a function of the processing capacity of the server and the current CPU and memory usage, and selects the server with the lowest load to take on a new user connection. The function may be linearly weighted by user-defined parameters, as follows:

connection usage=total_connections*100/server capacity;

server_load=cpu_weight*cpu_usage+ memory_weight*memory_usage+ connection_weight*connection_usage.

The server may accept new user requests from an arbitrarily large number of users; nothing in the system architecture of the present invention sets a maximum number of users. In some embodiments, however, the number of users may exceed the resources available on a given system. For example, the bandwidth to or from the server-side storage may become saturated or the processing power of the server may be exceeded. A long-term solution may be to increase the appropriate resources of the server. In the short term, however, the server may throttle back the bandwidth and/or processing resources used to host each client without affecting editing accuracy: For example, the server may temporarily reduce the frame rate and/or size of the streams sent to each client. Alternatively, a client requesting a complicated editing task may be informed that the result of the task is not viewable in real time. Once the resource shortage is resolved, the server may return to normal operation.

The server and clients may be implemented to be tolerant of faults. For example, if one user's process crashes, because it is compartmentalized with respect to the processes of other users, it may not affect those other processes. Furthermore, the crashing process may be recovered. Two copies of a user's current state may exist: one on the client and one on the server. A watchdog process running on the server may monitor each client/server connection for crashes. If a server process crashes, for example, the watchdog process may restart the process on the server, and upon reconnection with the client, may synchronize the latest state of the user's commands from the client. If a client process crashes, the watchdog process may copy the server's version of the editing state back to the client. In one embodiment, once the client is back on-line, the user is given a choice between restoring the crashed session, reverting to a saved session, or starting a new session.

The server may be implemented as a stateless server. In this embodiment, the server does not maintain a history of editing commands sent from the client. Instead, each request received from a client contains all of the state information necessary to reconstruct the client's entire editing session. In one embodiment, the client sends an XML file representing the time-based object currently being edited.

A user may create a timeline, such as the one depicted in FIG. 3, containing multiple layers of clips. In one embodiment, as described above, the server combines the clips into a flattened stream on the fly and transmits the flattened stream to the client. In another embodiment, the server preprocesses or "renders" the timeline into a flattened temporary file and streams the contents of the file to the user. Thus, the server may perform the rendering opportunistically, e.g., during a period of low resource utilization, and later stream the rendered timeline to a client during a period of high resource utilization (i.e., when it may not have been possible to flatten and transmit the stream on the fly). In one embodiment, the server renders a timeline in accordance with the frame rate and resolution currently being used by a user. In another embodiment, the server renders the timeline at a maximum allowable frame rate and resolution, and the server reduces the size of the render to the user's requested size and frame rate upon streaming. In this embodiment, the server need not re-render the timeline if the user reconfigures the client to display the stream at a different size and/or frame rate.

Trusted users working together using the same source media may choose to share data, such as rendered timelines or configurations of clips and layers. A client may present a user with a list of other, trusted users and a description of their work, and the first user may opt to incorporate some or all of the shared work. In one embodiment, shared work such as rendered timelines is automatically incorporated. Co-users on a trusted local- or wide-area network may be automatically authenticated, while co-users connected via an untrusted network, such as the Internet, must complete an invitation/acceptance handshake before their work may be shared.

Server architectures in accordance with the present invention, e.g., fully centralized processing and storage, may allow the server to parallelize editing requests sent from a client. For example, different portions of a timeline may be rendered in parallel and combined. Also, a user may play back portions of a timeline while the timeline is being rendered. In general, any editing tasks within a user's process that do not depend upon the completion of other tasks may be parallelized up to the limits of the server's resources. In one embodiment, the server parallelizes tasks as resources are available. In another embodiment, a user may request a certain level of parallelization.

Turning now to precise, fast, and frame-by-frame control of source media, in one embodiment, a hybrid video streaming technique is used to rapidly seek to arbitrary frames within the source media. When a client is playing a media file normally, i.e., an increasing sequence of frames at a standard rate, the server streams out the media in accordance with standard streaming techniques. As explained above, the stream may represent one or more media files that are composited (flattened) on the fly. When a user seeks to a random point in the media file, however, the server transitions into a frame-by-frame streaming mode. In this mode, the server identifies the type of the requested frame, backtracks to the last I-frame and reconstructs the requested frame, if necessary, and streams the reconstructed requested frame to the client. Thus, the client need not have downloaded any portion of the original media file in order to seek to the requested frame.

Figure 7:
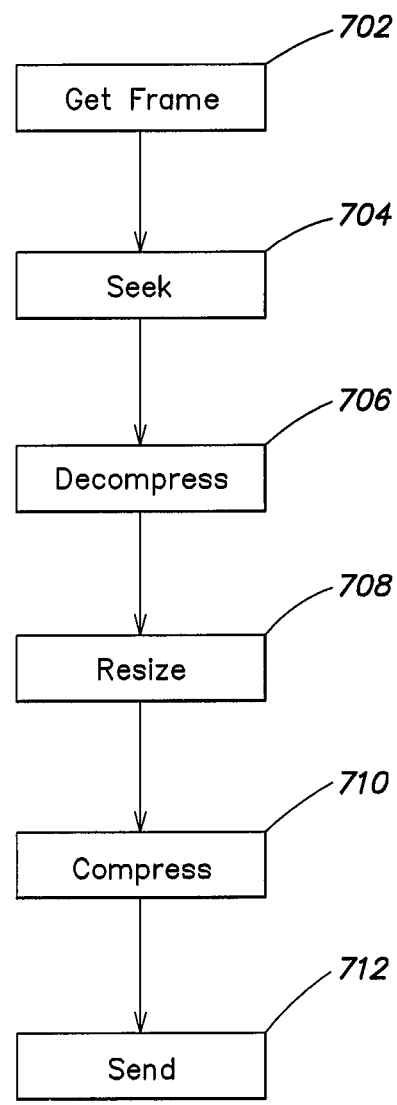
FIG. 7 is a flow diagram showing the steps involved in frame-by-frame streaming.

FIG. 7 illustrates one embodiment of the steps included in the frame-by-frame streaming mode. The server first receives a Get Frame request (702) from a client that has seeked to a position in a media file other than the normal playback position. The server then Seeks (704) to the appropriate position in the original media file. In one embodiment, the server reads the header information of the original media file to determine the position of the requested frame in the file. In another embodiment, the server estimates the position of the requested frame in the original media file based on the file size, encoding type, and frame rate. Finally, the server may search the original media file using an appropriate search algorithm, or may use any combination of these techniques to find the position of the requested frame.

Once the requested frame is found and possibly reconstructed, it may be Decompressed (706), Resized (708), and Compressed (710) if the pixel size of the requested frame is different from the pixel size of the media being streamed to the client. Finally, the frame itself is Sent (712), along with any audio data associated with the frame. Multiple frames may be streamed.

Because embodiments of the current invention provide fast and precise remote access to any frames in the original source media, a variety of applications may be implemented that would not otherwise be possible with a remote client. For example, the media may be "scrubbed" by rapidly seeking forward and backward through the file by, for example, clicking and dragging a slider bar coupled to media playback. As the media is scrubbed, frames of audio and/or video may be played at the client, even for sections of the original media not previously viewed. In one embodiment, the scrubbed frames are served out as fast as the server can seek and stream them to the client, at which point the server streams a representative selection of frames. In addition, the frame-by-frame streaming mode permits playback speeds and directions not normally possible with traditional streaming including, for example, 2× or 4× (or more) forward or reverse playback.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A system for remote video editing, the system comprising:
   a storage device for storing a source media file;
   an input for receiving, over a low-bandwidth network, video editing commands pertaining to the source media file;
   a virtual representation of edited media, the virtual representation comprising the editing commands and a link to the source media file;
   a media delivery engine that reads the source media file over a high-bandwidth link, applies the editing commands thereto, and, when playback of the edited media is requested, produces in real time a proxy representation of the edited source media file;
   an output for transmitting the proxy representation from the media delivery engine to a client over the low-bandwidth network,
   wherein the virtual representation comprises a plurality of layers, the media delivery engine being configured to composite the layers to produce the proxy representation as a composited stream in which the layers have been collapsed; and
   wherein the client includes a user interface for displaying a composited stream received from the media delivery engine in which the layers have been collapsed and for enabling a user of the client to manipulate portions of the received composited stream that originated from a first one of the plurality of layers independently from portions that originated from a second one of the plurality of layers by using layer information maintained by one or more of the virtual representation and the client, without maintaining the first and second layers themselves at the client.

2. The system of claim 1, further comprising a plurality of virtual representations, each of the virtual representations comprising one of a plurality of sets of editing commands.

3. The system of claim 2, further comprising a load-balancing module for allocating each of the plurality of virtual representations to one of a plurality of processing devices.

4. The system of claim 1, wherein a plurality of the video editing commands are applied to the virtual representation simultaneously.

5. The system of claim 1, wherein the low-bandwidth network is one of a local-area network, a wide-area network, or the Internet.

6. The system of claim 1, wherein the media delivery engine adjusts the bandwidth of the proxy representation in response at least one of a load on the low-bandwidth network or a load on the high-bandwidth link.

7. The system of claim 1, further comprising a watchdog module for recovering from an interruption of service.

8. A system for remote video editing, the system comprising:
   a client comprising:
      (a) an input for receiving a proxy representation of media;
      (b) a processor for decoding the proxy representation;
      (c) a graphical user interface for displaying content represented by the decoded proxy representation;
      (d) a user input for facilitating entry of commands for editing the decoded proxy representation; and
      (e) an output for transmitting the editing commands, and
   a server for receiving the editing commands, applying the editing commands to a source media file, and when playback of edited media is requested, generating in real time the proxy representation of the media in accordance with the source media file and the editing commands,
   wherein the edited media comprises a plurality of layers, and wherein the proxy representation is received by the client as a composited stream in which the layers have been collapsed, and
   wherein the graphical user interface enables a user to manipulate portions of the received composited stream that originated from a first one of the plurality of layers independently from portions that originated from a second one of the plurality of layers by using layer information maintained by at least one of the server and the client, without maintaining the first and second layers themselves at the client.

9. The system of claim 8, wherein the client is a thin client.

10. The system of claim 8, wherein the client is one of a desktop computer, workstation, laptop computer, netbook, and smartphone.

11. A method for remotely editing a video file, the method comprising:
   receiving, at a server, a video editing command from a remote client;
   modifying, at the server, a virtual representation of edited media in accordance with the received command, the virtual representation comprising a reference to a source media file stored on a storage device, the storage device being connected to the server over a high-speed link; and
   when playback of the edited media is requested, transmitting, to the remote client, a data stream generated in real time, the data stream comprising a representation of the source media file modified by the editing commands,
   wherein the virtual representation comprises a plurality of layers, and the plurality of layers are composited by collapsing the layers in the data stream transmitted to the client,
   and wherein the client includes a user interface for displaying the composited stream received from the server and for enabling a user to manipulate portions of the received composited stream that originated from a first one of the plurality of layers independently from portions that originated from a second one of the plurality of layers by using layer information maintained by at least one of the server and the client, without maintaining the first and second layers themselves at the client.

12. The method of claim 11, further comprising receiving text-based video editing commands from a plurality of remote clients.

13. The method of claim 11, wherein the server is connected to the client over a low-bandwidth network.

14. The method of claim 13, wherein the low-bandwidth network is one of a local-area network, a wide-area network, and the Internet.

15. A method for sending an individual video frame to a remote client, wherein the remote client is configured to receive commands for remote editing of a media file, the method comprising:
   receiving, at a server, a request from the remote client for the individual video frame;
   searching a media file for the individual requested frame, the media file being stored on a storage device connected to the server via a high-speed link; and
   when the individual video frame is requested, collapsing a plurality of layers of the video frame, and sending the collapsed video frame from the server to the client,
   wherein a user interface of the client enables a user to manipulate portions of the received video frame originating from a first one of a plurality of layers independently from portions that originated from a second one of the plurality of layers by using layer information maintained by at least one of the server and the client, without maintaining the first and second layers themselves at the client.

16. The method of claim 15, wherein the requested video frame is one of a P-frame and a B-frame.

17. The method of claim 16, further comprising seeking backward in the media file to an I-frame and reconstructing the requested frame.

18. The method of claim 15, wherein the server is connected to the client via a low-bandwidth network.

19. The method of claim 18, wherein the low-bandwidth network is one of a local-area network, a wide-area network, and the Internet.

* * * * *